United States Patent [19]

Warren

[11] Patent Number: 4,829,674
[45] Date of Patent: May 16, 1989

[54] SHAPING TOOL

[76] Inventor: Barry R. Warren, Rte. 1, Box 269, Cumberland Gap, Tenn. 37724

[21] Appl. No.: 99,088

[22] Filed: Sep. 21, 1987

[51] Int. Cl.⁴ ................................................ B26B 3/00
[52] U.S. Cl. .................................... 30/169; 15/236.08; 30/329
[58] Field of Search .................. 30/169, 172, 329, 332, 30/337–339, 340, 344; 15/236 R

[56] References Cited

U.S. PATENT DOCUMENTS

| 130,755 | 8/1872 | Shippey . | |
|---|---|---|---|
| 202,769 | 4/1878 | Washburn . | |
| 348,067 | 8/1886 | Spear . | |
| 1,707,207 | 3/1929 | Bianchi et al. . | |
| 1,721,822 | 7/1929 | Kroiss . | |
| 1,956,882 | 5/1934 | Stowell | 29/80 |
| 2,127,176 | 8/1938 | Kroecker | 29/80 |
| 2,453,198 | 11/1948 | Corbett | 30/169 X |
| 2,602,216 | 7/1952 | Romeo | 29/76 |
| 2,800,879 | 7/1957 | Quick | 119/92 |
| 3,185,193 | 5/1965 | Orr | 30/329 X |
| 3,531,841 | 10/1970 | McCord, Jr. | 29/78 |
| 3,710,467 | 1/1973 | Coon | 29/80 |
| 3,887,973 | 6/1975 | Coon | 29/78 |
| 4,047,504 | 9/1977 | Borba et al. | 119/92 |

FOREIGN PATENT DOCUMENTS

| 1084070 | 6/1933 | France | 30/340 |
| 112697 | 12/1944 | Norway . | |
| 151172 | 8/1955 | Norway . | |

Primary Examiner—Douglas D. Watts
Attorney, Agent, or Firm—Luedeka, Hodges & Neely

[57] ABSTRACT

The specification discloses a hand held surface shaping tool for shaping hardening filler applied to a work surface. The tool comprises an elongate blade member and an elongate blade holder. The blade member includes a serrated edge extending generally along its length for removing filler from the work surface when the blade is wiped across the hardened filler with the blade oriented generally perpendicular to its direction of movement. The holder has a length approximating the length of the blade member, and is configured to support the blade member substantially along its length in a predetermined fixed configuration. In one embodiment, the holder supports the blade in a bowed configuration so that the blade edge can be brought into engagement along its length with a concave or convex work surface by leaning the tool toward or away from the surface.

11 Claims, 5 Drawing Sheets

SHAPING TOOL

The present invention relates to a hand held surface shaping tool for shaping a hardening filler applied to work surfaces such as automobile body fenders, boat hulls and the like.

In certain types of surface repair work, and especially auto body repair, it is necessary to fill and repair damaged rounded surfaces. The curvature is often changing instantaneously and may range from convex to concave. Prior art has provided rasps and files which can be adjusted to conform to and shape a curved surface. However, these devices require manual internal adjustment of the frame of the tool to dispose them in a shape which conforms to the shape of the surface worked. It s desirable to have a device which will conform to a constantly changing curvature by mere positioning of the tool rather than manual internal adjustment of the tool.

Another problem encountered in body work is that, although the cutting rasps and files of the prior art are sometimes replaceable separate from the tool as a whole, the rasps and files often have elaborate forged or machined surfaces making them expensive to replace. These rasps and files, being fairly specialized tools, can usually only be had through a specialized dealer. It is, therefore, desirable that a tool be provided for effectively working a filled surface which incorporates a readily available, inexpensive and replaceable cutting element.

Known rasping or filing tools also suffer from the disadvantage that such tools usually must incorporate large, deep cutting teeth in order to remove material at a satisfactory rate. This means that the surface is usually left very rough and excess material must be left above the desired finished surface. This excess material ordinarily must be sanded off requiring a significant input of time and labor and producing a large amount of nuisance dust. A mean of shaping the surface to near finish texture and curvature with a minimum of time, labor and dust production is desirable.

Accordingly, it is an object of the invention to provide a tool which can be used to work a variety of curved surfaces without the hindrance of constant manual internal adjustment of the tool.

It is another object of the invention to provide a tool of the character described which incorporates an inexpensive, readily available replaceable cutting element.

It is a further object of the invention to provide a tool to work a filled surface to near finish texture and curvature with a minimum of labor and a minimum of dust production.

The above and other objects and advantages of the invention may best be understood by reference to the following detailed description when considered in conjunction with the accompanying drawings in which.

Before making specific reference to the drawings, the more general aspects of the invention will be described to facilitate a better understanding of the details to follow. In general, the invention includes a hand held surface shaping tool for shaping a hardening filler which has been applied to a work surface. Fillers of this type include the epoxy resin composition sold under the trademark BONDO, for example, as well as fiberglass resin compounds and other fillers typically applied to repair or fill damaged metal, plastic or wood surfaces. The shaping tool comprises an elongate blade member and an elongate blade holder. The blade member includes a serrated edge extending generally along its length for removing filler from the work surface when the member is wiped across the filler with the member oriented generally perpendicular to its direction of movement. The holder has a length approximating the length of the blade member, and is configured to support the blade member substantially along its length in a predetermined fixed configuration, while exposing the edge to enable the edge to be placed in contact with the filler. A handle is provided on the blade holder and is configured to enable the tool to be gripped and held in a manner which facilitates the aforementioned wiping movement of the blade member across the filler.

In a preferred embodiment, the blade member is provided by a conventional hacksaw blade which is typically flexible to deformation in a plane substantially perpendicular to the plane of the blade. In one form of the invention, the element holder is configured to dispose the blade member in a linear configuration. In another form, the holder is configured to dispose the blade member in a bowed or curvilinear configuration.

It has been found that a blade member of the character described such as a hacksaw blade provides a highly effective shaping action when wiped across hardening filler. A clear advantage of this feature of the invention is that hacksaw blades and the like are relatively inexpensive off the shelf items. Furthermore, it has been found that substantial utility is derived in accordance with the form of the invention in which the blade member is disposed in a bowed configuration. As will be more fully described, this provides a means by which the serrated edge can be made to conform to the shape of a curved surface by mere positioning of the device rather than an internal adjustment which is particularly advantageous where the shape of the surface is changing instantaneously.

Referring now to the drawings in which like reference characters refer to like or similar parts throughout the several views, several embodiments of a hand held shaping tool are shown illustrating various features of the present invention. Referring first to FIGS. 1A through 1E and FIG. 3, a linear version of the tool 10 includes an elongate blade 12, an elongate blade holder 14 and a handle 16. The blade 12 is preferably relatively thin, has substantially uniform width and thickness dimensions, and includes serrations 18 along one or both of its marginal edges. The blade is preferably provided by an item commonly referred to as a hacksaw blade.

The blade holder 14 is preferably provided by an elongate, rectangular piece of sheet metal or the like which is folded over along the center line of its length to define a slot 20 in which the blade 12 is received between opposed sidewalls 22. In the preferred embodiment, the length of the holder 14 approximates the length of the blade 12.

The sidewalls 22 of the holder 14 meet along a rib 24 which defines the depth to which the blade 12 penetrates the slot 20. The sidewalls preferably run parallel and straight along the length of the holder 14 to substantially define the linearity and overall length of the tool 10. The spacing between the sidewalls 22 is preferably determined so that the blade 12 is frictionally received and held between the sidewalls. The depth to which the blade 12 is received in the slot 20 as determined by the height of the sidewalls 22 is sufficient to limit deflection of the blade 12 as it is wiped across filler applied to a surface with the serrated edge 18 in contact with the filler.

The handle 16 is preferably a tubular piece which is dimensioned for gripping, and is bent over on its opposite ends and attached to the holder 14 adjacent its opposite ends. It is preferred that the handle 16 be formed of metal in which case attachment to the holder 14 is preferably accomplished by welding, and that the handle be disposed substantially parallel to the holder 14.

It is preferred in manufacturing the tool 10 that the tube used to form the handle 16 be bent at longitudinally spaced apart locations which are spaced slightly wider than the width of a typical hand. The bends preferably make about a 60° angle with the straight portion remaining between the ends and are cut off at a distance from the straight portion sufficient to provide a space 26 between the handle 16 and the holder 14 when the former is attached to the latter, through which the fingers of a gripping hand may be received. It is preferred that prior to cutting the bends, the tube be crimped or flattened adjacent the location of the cut to a thickness approximately equal to the thickness or width of the holder 14. The cuts are preferably coplanar and at equal distances from the straight portion of the handle so that when the handle is placed on the holder 14, the straight portion will be substantially parallel to the holder 14. The ends of the handle 16 are then welded to the holder 14 on the rib 24. Alternately, slots may be formed in the cut, flattened ends of the handle 16 in which the upper portion of the holder 14 is received prior to welding to strengthen the handle/holder connection.

It is noted that the ends of the slot 20 may be closed as by crimping the sidewalls 22 together at the ends of the holder to limit longitudinal displacement of the blade 12.

In a preferred form of the invention, the holder 14 has an overall length of about 12.5 inches as does the blade 12 which has a width of about 0.5 inches, a thickness of about 1/32 inches, and contains about 24 teeth per inch on the serrated edge 18. The holder is formed by folding along its length a rectangular piece of aluminum which is about 0.75 in. wide, 12.5 in. long, and 1/16 in. thick. The resulting slot is about 0.25 in. deep. The straight portion of the handle 16, which is ¾ in. outer diameter aluminum tubing is about 5 in. long and is substantially parallel to the holder 14. The bends space the center portion of the handle 16 about 1 in. from the holder 14.

Figures 3, 4:
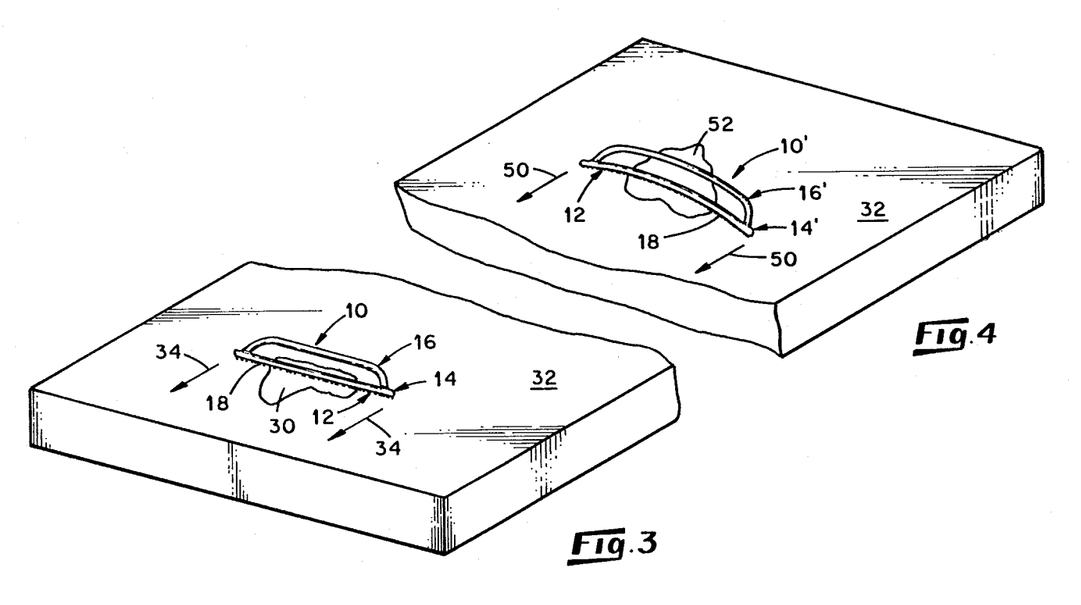
FIG. 3 is a perspective view illustrating use of the embodiment shown in FIG. 1A-1E to shape filler applied to a flat work surface.
FIG. 4 is a perspective view illustrating use of the embodiment shown in FIGS. 2A-2E.
Figure 5A:
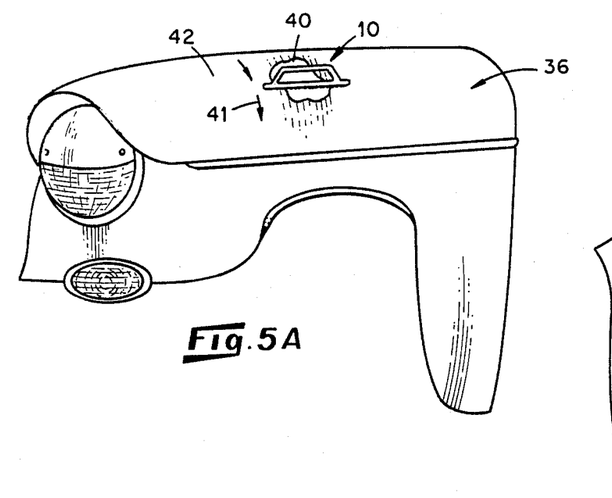
FIG. 5A is a perspective view illustrating use of the embodiment shown in FIGS. 1A-1E to shape filler applied to a convex work surface.
Figure 5B:
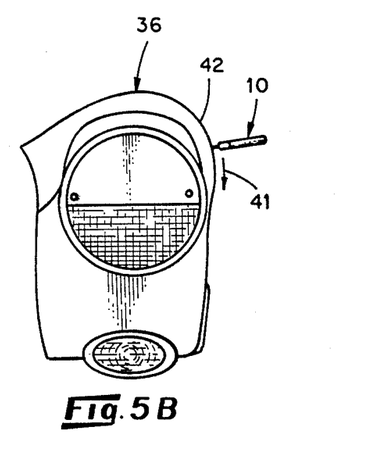
FIG. 5B is a front view of FIG. 2A.
Figure 6A:
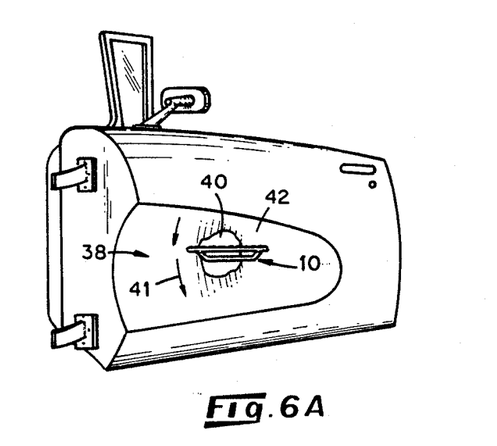
FIG. 6A is as perspective view illustrating use of the embodiment shown in FIGS. 1A-1E to shape filler applied to a concave work surface.
Figure 6B:
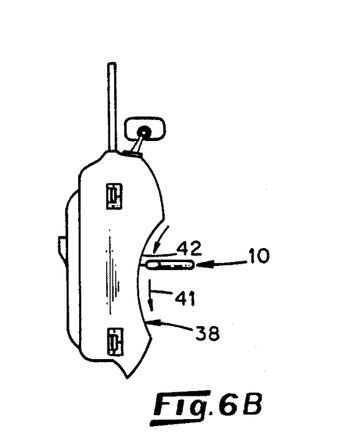
FIG. 6B is a front view of FIG. 3A.

FIG. 3 illustrates use of the tool 10 to shape a patch area 30 of filler applied on a flat work surface 32. The patch area 30 is normally slightly higher than the surrounding surface 32. The tool 10 is elevated from the surface 32 with the serrated edge 18 of the blade 12 in contact with the surface 32. The tool 10 is then wiped across the patch area 30 with the edge 18 in contact with the filler material. The action of the blade 12 removes a portion of the filler from the patch area 30 during each wipe across the patch area. Suitable pressure is applied and adjustments in the disposition of the blade 12 are made in order to effect the desired removal rate. Wiping is continued until the level of the patch area 30 is brought down substantially to that of the surrounding surface 32. The patch area remaining after being worked by the tool 10 should have a relatively smooth surface conforming substantially to that of the surface 32 and may be finished if necessary by sanding before priming or painting. However, experience has shown that working the surface of a patch area 30 with the tool 10 of the present invention in many cases results in a finished appearance suitable for priming and painting without the need for any sanding or further finish work.

Though the tool 10 will remove material when the blade is moved across the surface of the patch area 30 in most imaginable directions and orientations, it is believed that best results will be obtained when the tool 10 is moved across the patch area 30 with the blade 12 oriented substantially perpendicular to the direction of movement of the tool 10 indicated by the direction of arrows 34.

Referring to FIGS. 5A and 5B, and FIGS. 6A and 6B, the tool 10, even in the linear configuration shown and described above with reference to FIGS. 1A through 1E, can be used to shape a convex surface 36 or a concave surface 38 as long as there is a substantially linear component of the surface to serve as a guide for the blade 12. In the illustrations, the surfaces 36 and 38 are defined by portions of an automobile fender and door, respectively, but it is understood that the tool may be used to work other filled surfaces such as surfaces on boot hulls, for example.

Normally, a patch area 40 containing hardening filler is surrounded by an undamaged area 42 on either the convex surface 36 or the concave surface 38. To achieve the desired shape in the patch area 40, the tool 10 is wiped across the patch area in a direction substantially perpendicular to the linear component of the surrounding surface as indicated by the direction of arrows 41. As a result, the serrated edge 18 of the blade 12 lies on a line segment substantially coincident with the linear component of the surface and when viewed from the end of the tool as in either FIGS. 5B or 6B, the path of the edge 18 defines a curve which coincides with the curvature of the surface.

Figure 1A:
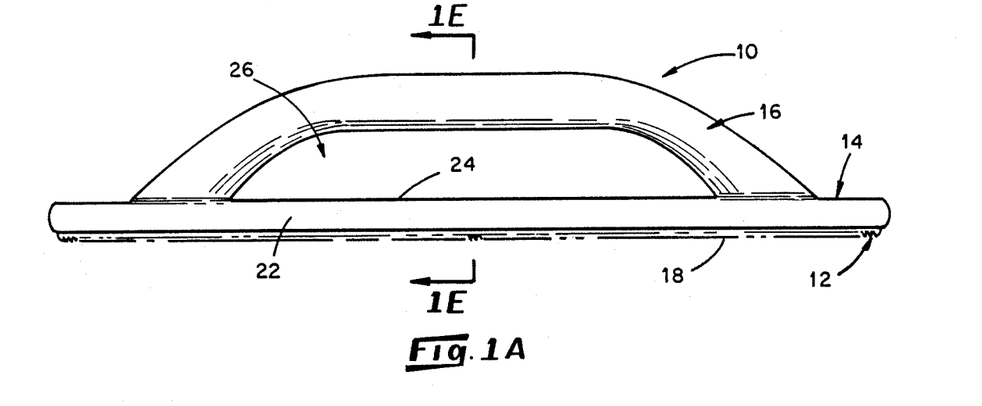
FIG. 1A is an elevational view of one embodiment of a hand held surface shaping tool constructed in accordance with the present invention.
Figure 1B:
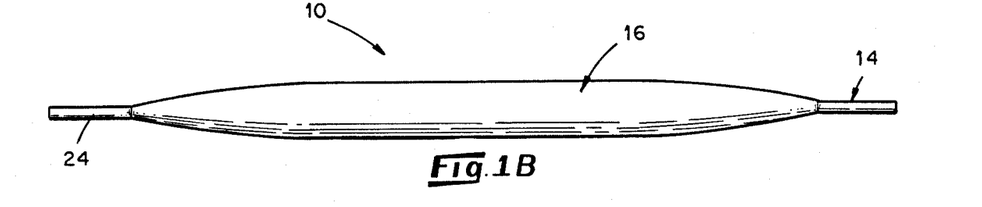
FIG. 1B is a top view of the tool shown in FIG. 1A.
Figure 1C:
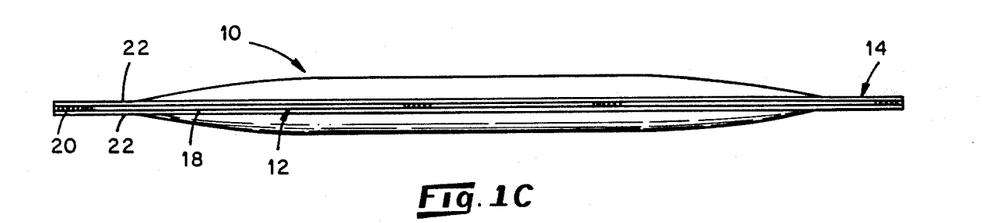
FIG. 1C is a bottom view of the tool shown in FIG. 1A.
Figure 1D:
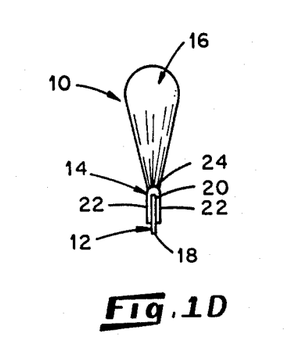
FIG. 1D is an end view of the tool shown in FIG. 1A.
Figure 1E:
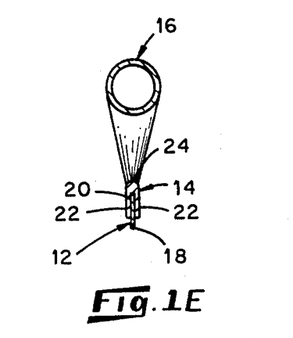
FIG. 1E is a view taken along line 1E—1E of the tool shown in FIG. 1A.
Figure 2A:
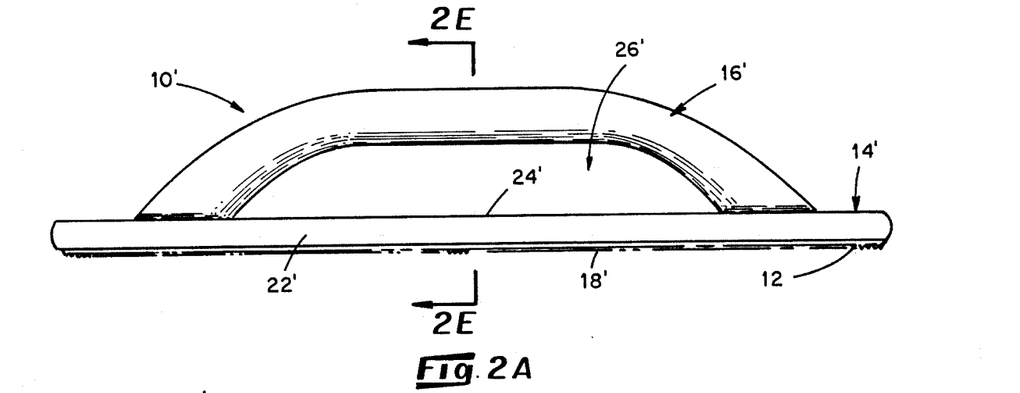
FIG. 2A is an elevational view of a hand held surface shaping tool constructed in accordance with another embodiment of the invention.
Figure 2B:
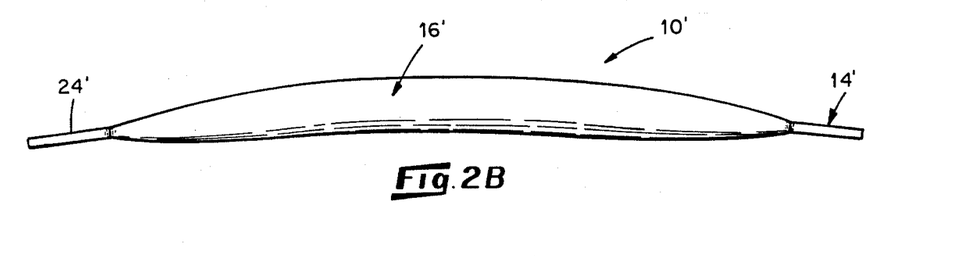
FIG. 2B is a top view of the tool shown in FIG. 2A.
Figure 2C:
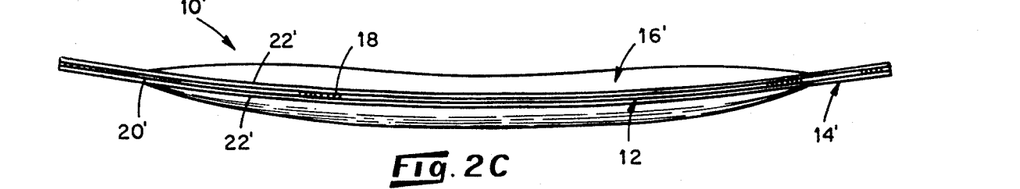
FIG. 2C is a bottom view of the tool shown in FIG. 2A.
Figure 2D:
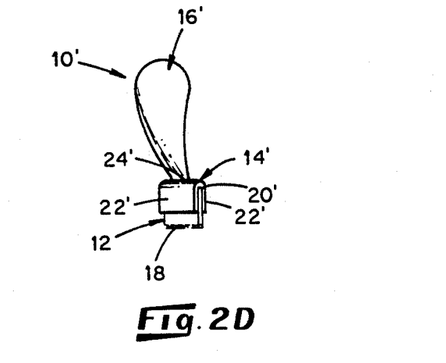
FIG. 2D is an end view of the tool shown in FIG. 2A.
Figure 2E:
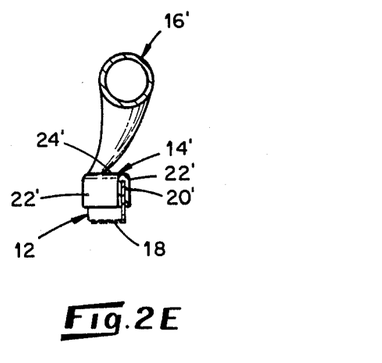
FIG. 2E is a view taken along line 2E—2E of the tool shown in FIG. 2A.

Referring now to FIGS. 2A through 2E and FIG. 4, another embodiment of the tool 10' is shown which includes a bowed holder 14' and a correspondingly bowed handle 16'. The blade 12 of FIGS. 1A through 1E, being flexible in a plane perpendicular to the plane of the blade in accordance with its preferred form, can easily be deformed to fit into any mildly bowed configuration of the holder 14' as shown in FIGS. 2C and 2B. Thus, the blade 12 of FIGS. 2A through 2E can be the identical blade 12 of FIGS. 1A through 1E and is thus interchangeable in the various embodiments of the invention. the holder 14' of FIGS. 2A through 2E is substantially identical in configuration to the holder 14 of FIGS. 1A through 1E with the exception that the holder 14 is formed in an arcuate configuration as shown in order to dispose the blade 12 in an arcuate configuration. The same is true with regard to the handle 16' as compared with the handle 16 of FIGS. 1A through 1E, the handle 16' preferably being arcuate so as to follow the curvature of the holder 14'.

Production of the tool 10' is accomplished in substantially the same manner as the tool 10 of FIGS. 1A through 1E with the additional steps of incorporating the desired arcuate configurations in the holder 14' and handle 16'.

In a preferred form, the tool 10' has the dimensions set forth above and the curvature of the holder 14' is such that the curvature of the blade 12 corresponds substantially to an arc of a circle whose radius is about 3 ft. The bowed configuration of the blade 12 and resulting arcuate serrated edge 18 is advantageous in the working of filler applied to convex or concave surfaces as will be described. In FIG. 4, however, it may be seen that, although the holder 14' and blade 12 are in a bowed configuration, this configuration is also capable of use in working filler applied to the flat work surface 32 by positioning the tool 10' so that the blade 12 is disposed substantially normal to the surface 32. In this disposition, the edge 18 contacts the surface 32 substantially along its length. The tool 10 is then wiped across the surface 32 as indicated by the direction of arrows 50 to remove filler applied in a patch area 52.

Figure 7A:
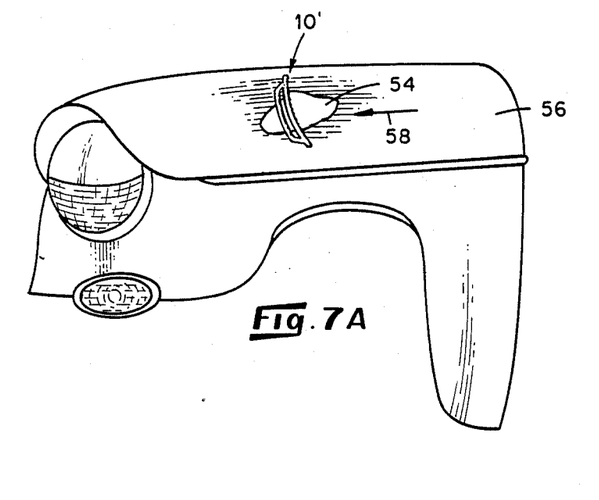
FIG. 7A is a perspective view illustrating use of the embodiment shown in FIGS. 2A-2E to shape filler applied to a convex work surface.
Figure 7B:
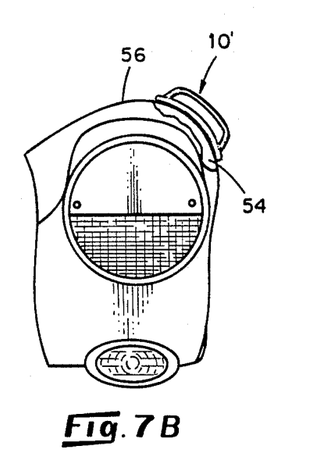
FIG. 7B is a front view of FIG. 7A.

FIGS. 7A and 7B illustrate application of the tool 10' to remove excess filler in a patch area 54 on a convex work surface 56, in this case the front fender of an automobile. The process of working th surface to remove excess filler is accomplished in general by tilting the tool 10' to bring the serrated edge 18 into engagement along its length with the contour of the surface 56, and then moving the tool 10' across the patch area 54 repositioning the tool 10' as necessary during its movement to maintain lengthwise engagement of the serrated edge 18 with the surface 56. More specifically, as a starting point, it can be said that the center point of the length of the holder 14, defines a center point of the blade 12. Placing the center point of the blade 12 at a point on the surface 56, the edge 12 of the blade 12 is disposed in a plane which is tangent to the surface 56 at the point of contact. By tilting the tool 10' so that the ends of the blade 12 move downwardly out of the tangent plane to contact the convex surface 56, the edge 18 of the blade 12 may be made to substantially coincide with the curvature of the surface 56 so that lengthwise engagement is established between the blade 12 and the surface. Movement of the tool 10' across the surface 56 with the blade 12 oriented substantially perpendicular to the direction of movement of the tool 10' as indicated by the direction of arrow 58 will produce the desired convex shape in the patch area 54. The orientation and disposition of the tool 10' is adjusted as necessary to maintain an effective shaping action and to maintain lengthwise engagement of the blade 12 with the surface.

Figure 8A:
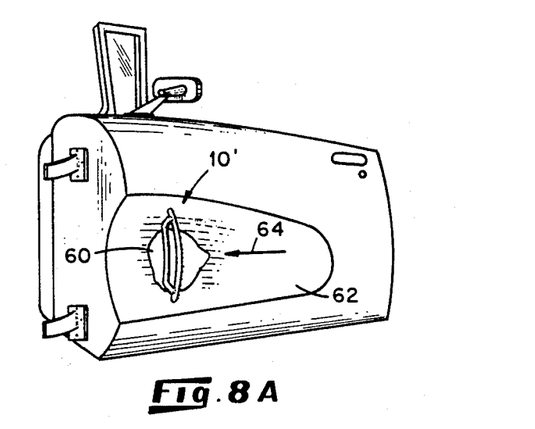
FIG. 8A is a perspective view illustrating use of the embodiment shown in 2A-2E to shape filler applied to a concave work surface.
Figure 8B:
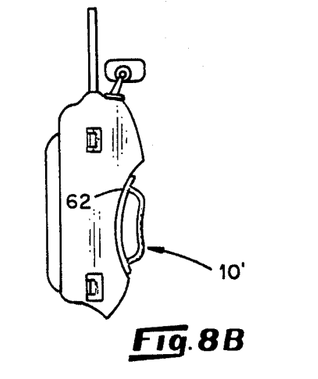
FIG. 8B is a front view of FIG. 8A.

FIGS. 8A and 8B illustrate a procedure for removing excess filler applied in a patch area 60 on a concave work surface 62. Use of the tool 10' in this instance is essentially identical to that described above with reference to FIGS. 7A and 7B. However, when working a concave surface, the ends of the edge 18 on the blade 12 will be the first to contact the concave work surface 62 when the blade 12 is disposed perpendicular to a plane tangent to a point on the surface intersected by a line normal to the plane and passing through the center point on the blade. In this orientation of the tool 10', a crescent-shaped space exists between the serrated edge 18 and the surface 62. In order to bring the edge 18 into lengthwise engagement with the concave surface 62, the tool 10' is tilted to rotate the center point of the blade 12 downwardly until the edge 18 of the blade 12 coincides with the curvature of the concave surface 62. Then, movement of the tool 10' across the patch area 60 with the blade 12 oriented generally perpendicular to the direction of movement of the tool as indicated by the direction of arrows 64 will produce the desired concave shape in the patch area 60. As previously mentioned, adjustment to changes in the curvature of the concave work surface 62 are accommodated by repositioning the tool 10' with respect to the surface 62 as the device 10' is moved. For example, in a condition in which the concave surface 62 is becoming more concave, the tool 10 is further tilted with respect to the surface 62 during its movement, and vice versa.

It is believed that skill in this practice of using the tool 10' can be developed fairly rapidly so that surfaces of widely varying shapes and rapidly changing contours can be worked proficiently.

In connection with the bowed or arcuate form of the tool 10', it is noted that the direction of movement of the tool 10' on a given surface is preferably in the direction of the smaller of the two angles made by the blade 12 with the surface. That is, considering the use of the tool 10' as illustrated in FIG. 7A, tilting of the tool 10 to bring the serrated edge 18 into lengthwise engagement with the surface 56 causes the blade 12 to make an acute angle with the surface 56 on the left-hand side of the tool 10' as viewed in the figure which is on the leading side of the tool 10'. It is believed that the serrated edge 18 is more effective in removing excess filler in this orientation when moved in the indicated direction. Similarly, the tool 10', when used on the concave surface 62 of FIG. 8, is preferably moved in a direction so that the side of the blade 12 which makes an acute angle with the surface 62 is on the leading side of the tool 10'.

The above-described embodiments of the present invention offer numerous advantageous over known tools and devices used to work filler applied to damaged surfaces. For example, the tool is simple in construction and has no moving parts. Manufacture of the tool can be accomplished using conventional, readily available materials and by well-known processes. Furthermore, it has been discovered in accordance with the invention that a simple blade having a serrated edge provides an effective means for removing excess filler applied to damaged surfaces. The blade is preferably supplied by a conventional hacksaw blade which is a well-known item, widely available and relatively inexpensive in cost. Thus, replacement of the blade is not a significant inconvenience or economic consideration. Also, hacksaw blades, being made to cut metal, do not themselves abrade to any significant degree when used on conventional filler substances and, thus, would have a fairly low frequency of replacement under these circumstances. In addition, the holder of the present invention having a bowed configuration can be used to effectively remove excess filler applied to convex and concave surfaces without the need for any internal manual adjustment of the tool which has been a significant problem with tools used to work rounded surfaces of this type in the past.

Although particular embodiments of the shaping tool of the present invention have been described in the foregoing detailed description, it will be understood that the invention is capable of numerous rearrangements, modifications and substitutions of parts without departing from the scope of the invention as set forth in the claims below.

I claim:

1. A hand held surface shaping tool for shaping a hardening filler which has been applied to a work surface in an uncured, pliable condition and which subsequently cures to a hardened condition, said tool comprising:
   an elongate hacksaw-type blade member including a serrated edge generally along its length for removing filler from the work surface when the blade member is wiped sidewise across the filler with said edge in contact with the filler and having a length which is at least ten times longer than its width wherein the width is measured across said blade member from the serrated edge thereof and which is capable of being flexed between a planar condition at which the serrated edge is substantially straight and a nonplanar condition at which the serrated edge is nonlinear but contained generally within a plane;
   an elongate blade holder having a length approximating the length of said blade member and being configured to support said blade member substantially along its length in a predetermined fixed configuration so that said edge is exposed and capable of being placed in contact with the filler;
   handle means attached to said blade holder and being configured to enable the tool to be gripped and held in a manner facilitating the aforesaid wiping movement of said blade member across the filler when the filler is in its pliable condition; and
   said blade holder adapted to support said blade member in a relatively rigid condition along its length so that said blade member resists forces which would otherwise tend to bend the blade member as it is wiped across the filler as aforesaid.

2. The tool of claim 1, wherein said blade holder is essentially straight along its length.

3. The tool of claim 1, wherein said blade holder is configured to support said blade member substantially continuously along the length of said member.

4. The tool of claim 1, 2 or 3, wherein said blade holder is configured to dispose said blade member in a bowed configuration so that said blade edge can be brought into engagement substantially along its length with a convex or concave work surface by shifting the angle of said blade member with respect to the concave or convex work surface, whereby file applied to a concave or convex surface can be shaped to substantially conform to the shape of the work surface without an internal mechanical adjustment of the tool.

5. The tool of claim 1, wherein said blade holder comprises an elongate generally rectangular stock of sheet metal folded over generally along the center line of its length to form an engaging channel, said channel being configured to frictionally receive said blade substantially along its length.

6. The tool of claim 1 or 6, wherein said handle means further comprises an elongate generally arcuate tubular handle rigidly fastened at its opposite ends to opposite ends of the element holder.

7. A hand held surface shaping tool for shaping a hardening filler which has been applied to a work surface in an uncured pliable condition and which subsequently cures to a hardened condition, said tool comprising:
   a disposable hacksaw blade having a serrated edge extending along the length thereof and defining an engaging edge and a width as measured across the blade from the serrated edge thereof which is at least ten times smaller than the length of the blade and wherein said blade is capable of being flexed from a planar condition at which the serrated edge is substantially straight to a nonplanar condition at which the serrated edge is nonlinear but contained generally within a plane;
   a blade holder for holding said hacksaw blade, said blade holder comprising means defining an elongate engaging channel which is configured to frictionally receive said hacksaw blade substantially along its length when said blade is inserted edgewise therein so that said serrated edge is in an exposed condition for placement in contact with the filler when in its pliable, uncured condition;
   a handle rigidly connected to the blade holder and configured to enable gripping of the tool to facilitate shaping of the filler as the blade is wiped sidewise across the surface of the filler in a direction generally perpendicular to a side of the blade and the serrated edge is moved in contact with the filler; and
   said blade holder adapted to hold the blade in a rigid condition and in a fixed configuration so that as the blade is wiped across the filler as aforesaid, the blade unyielding resists forces which would otherwise tend to bend the blade out of its fixed configuration.

8. The tool of claim 7, wherein said blade holder is configured to hold said hacksaw blade straight along its length.

9. The tool of claim 7 or 8, wherein said blade holder is configured to dispose said blade in a bowed configuration so that said blade can be brought into engagement substantially along it length with a convex or concave work surface by shifting the angle of said blade with respect to the concave or convex work surface, whereby filler applied to a concave or convex surface can be shaped to substantially conform to the shape of the work surface without an internal mechanical adjustment of the tool.

10. A hand held surface shaping tool for shaping a hardening filler which has been applied to a work surface in a pliable uncured condition and which subsequently cures to a hardened condition, said tool comprising:

an elongated blade member of a hacksaw blade-type including a serrated edge along at least one of its marginal edges for removing filler when said blade member is wiped sidewise across the filler with said edge in contact with the filler and having a length which is at least ten times longer than its width wherein the width is measured across the blade member from the serrated edge thereof and which is capable of being flexed between a planar condition at which the serrated edge is substantially straight and a nonplanar condition at which the serrated edge is nonlinear but contained generally within a plane;

an elongate blade holder having a length approximating the length of said blade member and being configured to support said blade substantially along its length while exposing said serrated edge so that said edge can be placed in contact with the filler substantially along its length;

a handle attached to said blade holder and configured to enable gripping of the tool to facilitate wiping of said blade member across the filler as aforesaid; and said blade holder being configured to rigidly support said blade member in a bowed configuration so that as the blade is wiped across the filler as aforesaid, the blade unyielding resists forces which would otherwise tend to bend the blade out of its bowed configuration.

11. The tool of claim 1, wherein said blade holder includes stop means associated with the opposite ends of the blade member for limiting longitudinal movement of the blade member along the length of the holder.

* * * * *

UNITED STATES PATENT AND TRADEMARK OFFICE
CERTIFICATE OF CORRECTION

PATENT NO. : 4,829,674

DATED : May 16, 1989

INVENTOR(S) : Barry R. Warren

It is certified that error appears in the above-identified patent and that said Letters Patent is hereby corrected as shown below:

Column 1, line 17, "s" should be -- is --.

Column 1, line 41, "mean" should be -- means --.

Column 2, line 28, after "in" insert -- FIGURES --.

Column 5, line 19, "the" should be -- The --.

Column 5, line 53, "th" should be -- the --.

Column 5, line 62, "14" should be -- 14' --

Column 6, line 37, delete "device" and insert -- tool --

Column 8, line 5, "file" should be -- filler --

Signed and Sealed this

Fifth Day of June, 1990

Attest:

HARRY F. MANBECK, JR.

*Attesting Officer*     *Commissioner of Patents and Trademarks*